United States Patent [19]

Bradley

[11] 4,016,767
[45] Apr. 12, 1977

[54] ENERGY ENGINE NUMBER TWO

[76] Inventor: Robert Wayne Bradley, 27751 No. 46 Sidney Drive, Euclid, Ohio 44132

[22] Filed: Sept. 11, 1975

[21] Appl. No.: 612,482

[52] U.S. Cl. .................................. 74/25; 74/37
[51] Int. Cl.² .................................... F16H 21/16
[58] Field of Search .............................. 74/25, 37

[56] References Cited

UNITED STATES PATENTS

| | | | |
|---|---|---|---|
| 762,189 | 6/1904 | Norton | 74/25 |
| 2,316,760 | 4/1943 | Andersen et al. | 74/37 |
| 2,327,135 | 8/1943 | Scott | 74/37 |
| 2,705,427 | 4/1955 | Schipper | 74/37 |

*Primary Examiner*—Samuel Scott
*Assistant Examiner*—Wesley S. Ratliff, Jr.

[57] ABSTRACT

Energy engine number two is made to convert the motion of devices that operate with a push pull motion such as hydraulic cylinders into a rotary motion. The engine is composed of units, to increase the power more units are added, one behind the other. First I have a frame to which four double action hydraulic cylinders are mounted. On the end of each piston of the hydraulic cylinders is mounted a bar with one way chain connectors on each end. Two chains are used, one on each side of the cylinders the chains are kept in position by guide sprockets. The chains are connected to the power shaft assembly. When the cylinders are activated the pistons move out from the cylinders and connect the chains on the right of the cylinders. When the pistons are fully extended they activate electric switches that reverse the direction of there movement. When the pistons are fully retracted they again activate electric switchs and reverse there direction. This is accomplished by using electric solenoids to operate the hydraulic controls. One chain moves in a clockwise direction and the other chain moves in a counter clockwise direction. This is brought to one direction at the power shaft by using two gears connected to two sprockets.

4 Claims, 1 Drawing Figure

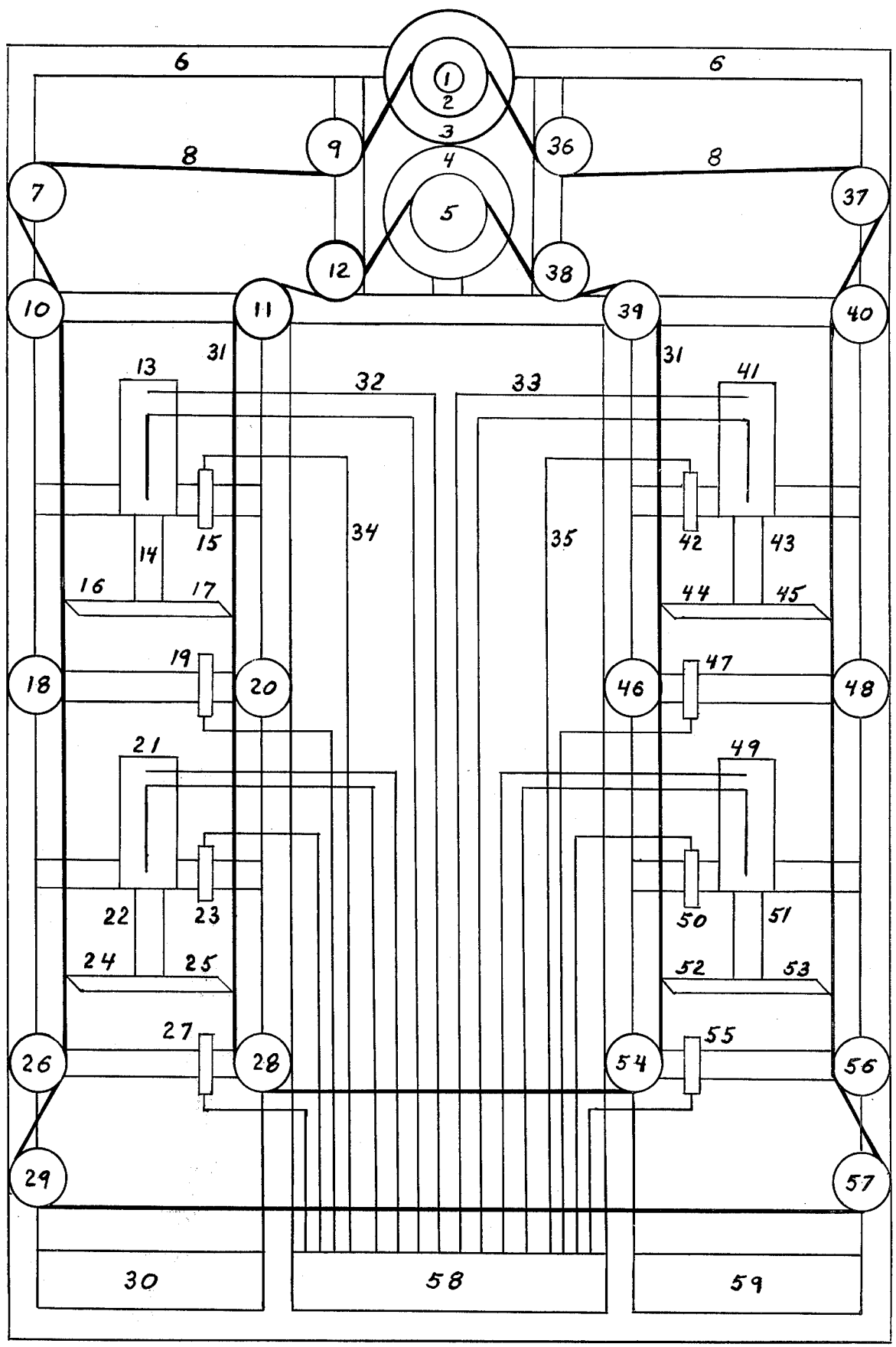

ENERGY ENGINE NUMBER TWO

SUMMARY

A device for converting reciprocating motion into rotary motion is provided. The device includes first and second continuous loops of chain with each chain loop being connected to rotating means. Means are provided which inter-connect the rotating means for unitary output. These means include means to reverse the output direction of one of said rotary means. The input means include at least one reciprocating piston with each piston having a first driving connection with the first chain loop and a second driving connection with the second chain loop. Each drive connection is a one-way chain drive connection. Each of the first drive connections is positioned for driving in one direction of reciprocation and each of the second drive connections is positioned for driving in the opposite direction of reciprocation, whereby reciprocating motion is converted to rotary motion during both directions of reciprocation.

DESCRIPTION OF THE DRAWING

The single FIGURE is a somewhat diagrammatic representation of a device for converting reciprocating motion to rotary motion according to this invention.

DESCRIPTION OF THE PREFERRED EMBODIMENT

A preferred embodiment of a device for converting reciprocating motion to rotating motion is made as follows: I will describe and show in a drawing a typical power unit of the device. The reason being the power can be increased or decreased by changing the size of the unit or by adding more units one behind the other and extending the power shaft. The controls are standard hydraulic controls operated electrically. The typical hydraulic lines (numbers 32 and 33) The typical electric lines (numbers 34 and 35) all run to the control box (number 58) located at the bottom of the unit where they control the hydraulic pumps (numbers 30 and 59) to control the working of the hydraulic cylinders.

The basic power unit is made of metal. I will start with the frame (nubmer 6) to which the components are added. For this unit I am using four double action hydraulic cylinders (numbers 13, 21, 41 and 49). To start the cycle the cylinders will be in the retracted position this will activate electric switches (numbers 15, 23, 42 and 50). This will activate the pistions numbers 14, 22, 43 and 51 in the hydraulic cylinders into motion. On the ends of the pistons I have attached metal bars to which I have attached on each end one way chain connectors. These chain connectors are conventional in configuration and are standard items of commerce. One-way chain connectors operate to provide a driving inter-connection with the chain in one direction of motion and to override a chain in a non-driving relationship in the opposite direction of rotation. These one-way connectors are represented in the diagram and designated by the reference characters 16, 17, 24, 25, 44, 45, 52 and 53. The diagrammatic representation of them is such that the chain connectors 17, 25, 45 and 53 have driving connections with their respective chains when the pistons 14, 22, 43 and 51 are moving downwardly or extending as viewed in the single figure, and will override or not drivingly connect on their return or upward motion as viewed in the FIGURE. The chain connectors 16, 24, 44 and 52, on the other hand, are diagrammatically shown so that when the pistons 14, 22, 43 and 51 are moving upwardly or retracting as viewed in the FIGURE, they will drivingly inter-connect their respective chains, but when the pistons are moving downwardly or extending, the connectors 16, 24, 44 and 52 will override or not drivingly inter-connect with their respective chains. Therefore, during an extending or downward movement of the pistons 14, 22, 43 and 51, the chain 31 will be driven counter-clockwise by the chain connectors 17 and 45, while the chain connectors 44 and 52 will override this chain, while the chain 8 will be driven clockwise by chain connectors 45 and 53, while the chain connectors 16 and 24 override this chain. On their return or upward movement, the chain 31 will still be driven counter-clockwise, but this time by means of chain connectors 44 and 52 drivingly connecting chain 31, while chain connectors 17 and 25 override chain 31, and the chain 8 will still be driven clockwise, but this time by chain connectors 16 and 24, while chain connectors 45 and 53 override this chain. As the pistons extract the one way chain connectors (numbers 17, 25, 45, and 53) will connect to two roller type chains (numbers 8 and 31) causing chain number eight to revolve in a clockwise motion and chain number 31 to revolve in a counter clockwise motion. The chains are kept in position throughout the cycle by using guide sprockets (numbers 7, 9, 10, 11, 12, 18, 20, 26, 28, 29, 36, 37, 38, 39, 40, 46, 48, 54, 56, 57). The four guide sprockets (numbers 9, 12, 36 and 38) are adjustable to keep the required tension on the chains. When the pistons are fully extended the metal bars will make contact with the electric switchs (numbers 19, 27, 47 and 55). This will activate the hydraulic controls to reverse the direction of the pistons. To offset any time lapse of the pistons during the cycle, one switch will activate all the switches in that part of the cycle. As the pistons retract the one way chain connectors on the opposite ends of the metal bar (numbers 16, 24, 44 and 52) will connect to chain number thirty-one causing it to revolve in a counter clockwise motion and chain number eight to revolve in a clockwise motion. When the pistons are fully retracted this will complete the cycle. At this point we have two chains each revolving in a different direction. To end up with one direction to turn the power shaft (number 1) I am using two sprockets numbers (2 and 5) which are connected to two gears numbers (3 and 4). The gears numbered (3 and 4) are meshed. This reverses the counter clockwise motion of chain number thirty-one to coincide with clockwise motion of chain number eight. Thus keeping the power shaft revolving in one direction.

The embodiment of the invention in which an exclusive privilege or property is claimed is defined as follows.

1. A device for converting reciprocal motion to rotary motion comprising,
   first and second continuous loops of chain,
   each of said chain loops being connected to rotary means, means inter-connecting said rotary means for unitary output including means to reverse the output direction of one of said rotary means,
   input means,
   said input means including at least one reciprocating member, each reciprocating member having a first driving connection with the first chain loop and a second driving connection with the second chain loop, each drive connection being a one-way drive chain drive connection; said first drive connections being positioned for driving in one direction of reciprocation and the second drive connections being positioned for driving in the opposite direction of rotation, whereby reciprocating motion is converted to rotary motion during both directions of reciprocation.

2. The invention as defined in claim 1 further characterized by each loop having two opposed straight runs of chain, and wherein there are driving connection means in each straight run.

3. The invention as defined in claim 1 wherein said means to reverse the output direction includes a geared interconnection between said rotary means.

4. The invention as defined in claim 2 wherein the segments of the straight runs of the two loops are parallel, and said pistons are disposed between the segments of the loops.

* * * * *